Sept. 8, 1970 AKIRA INOUE 3,528,019
F-M DEMODULATION SYSTEM EMPLOYING A BALANCED LIMITER AND A BALANCED AMPLIFYING CIRCUIT
Filed Oct. 31, 1967

INVENTOR.
AKIRA INOUE
BY
OSTROLENK, FABER, GERB & SOFFEN
ATTORNEYS 3,528,019

F-M DEMODULATION SYSTEM EMPLOYING A BALANCED LIMITER AND A BALANCED AMPLIFYING CIRCUIT

Akira Inoue, Minato-ku, Tokyo-to, Japan, assignor to Nippon Electric Limited, Tokyo, Japan Filed Oct. 31, 1967, Ser. No. 679,312
Claims priority, application Japan, Nov. 4, 1966, 41/72,980
Int. Cl. H03k 9/08; H03d 3/06; H04b 1/16
U.S. Cl. 329—106 5 Claims

ABSTRACT OF THE DISCLOSURE

The present disclosure broadly teaches an F-M demodulating scheme and apparatus in which the F-M signal is converted to a pulse-width-modulated signal and is demodulated to reproduce a replica of the transmitted signal. The pulse width modulation produces an output signal which has extremely good frequency response over a wide frequency band and excellent signal-to-noise (S/N) characteristics resulting from the employment of a balanced system in which balanced signals (i.e. equal but opposite in phase) are amplified phase delayed relative to one another and applied to a gate circuit to generate pulse width modulated signals which may be demodulated through low-pass filter means to produce a final output signal having the above mentioned advantageous characteristics.

The present invention relates to F-M systems and more particularly to a novel F-M demodulator employing balanced circuits operating upon the F-M signals throughout all stages of the demodulator to yield a device having excellent linearity and signal-to-noise ratio over a wide operating frequency band.

A variety of techniques are employed in conventional systems for the purpose of demodulating F-M signals transmitted from a remote point. In one conventional F-M demodulation system the input F-M signal undergoes limiting action (i.e. it is amplitude limited). The resulting signal is simultaneously applied to two channels of the demodulator whereas in the second of the two channels the signal undergoes phase delay as a result of being passed through a delay line, as well as amplification. The resulting signals developed within each of the channels are then applied to a gate circuit which produces a gate output signal converting the F-M signal into a pulse-width-modulated signal. This (PWM) signal is then passed through a low-pass filter in order to derive the demodulated signal.

In order to improve the *S/N* ratio of subsequent video amplification stages connected in cascade with the demodulation stage, it is conventional to provide means for enhancing the demodulation sensitivity. One typical approach is to employ a demodulation system (hereinafter referred to as a PWM conversion type demodulation system for the sake of brevity) in which the pair of signals applied to the gating circuit are, immediately prior thereto, each phase split to thereby create two pairs of signals differing in phase from one another for application to the gate circuit.

The PWM conversion type demodulation system has been found to be superior to other conventional demodulation systems from the viewpoint of linearity in that the frequency-discriminated output is substantially linear. However, the characteristic of linearity can only be obtained when the waveform of the input signals applied to the gate circuit is perfectly rectangular. In any of the conventional PWM systems, however, it has been found that the frequency response of the phase splitting circuit is unsatisfactory. Also, the output signals of the phase splitters do not remain balanced over a wide operating frequency band, the above defects have also been found to cause the following disadvantages:

A degradation in the linearity of output signals in the upper region of the usable pass-band; carrier leakage into subsequent stages of the F-M demodulation system as a result of the unbalanced condition at the gate circuit thereby causing a degradation in the *S/N* ratio of the demodulated signal, as well as other defects:

The present invention is characterized by providing a new and improved PWM conversion type demodulation system in which the need for phase splitting circuits is eliminated and well balanced F-M signals over a sufficiently wide pass-band are obtained through the use of balanced circuits providing a capability of demodulating F-M signals over a wide operating band under the extremely favorable conditions of excellent linearity and excellent *S/N* ratio.

The PWM conversion type demodulation system of the present invention is comprised of essentially the following circuits:

A balanced type limiter for removing amplitude variations in the input signal by the suppression or clipping of peaks in incoming F-M signals which exceed a certain constant amplitude and for shaping the input waveform into as close to a rectangular shape as possible. The balanced signals are applied to balanced R-F amplifiers in order to deliver two pairs of balanced amplified signals to subsequent stages. A balanced delay network is coupled to one of the amplifiers to provide a phase delay of $(1+2n)\pi/2$ radians ($n$ being an arbitrary positive integer for the balanced signals of either pair at or near the center carrier frequency of the pass-band. The balanced delayed signals, together with the signals which do not undergo delay, are applied to a gate circuit for producing a pulse width modulated signal. The resulting PWM signals are then applied to a low-pass filter for removal of the carrier frequency components contained in the PWM signal passed by the gate circuit to produce the final demodulated signal.

A typical example of the demodulation system of the present invention and its operation is as follows:

The incoming F-M signal undergoes amplitude limiting by means of a balanced type limiter to convert the incoming signal to one having an amplitude and waveform which is as even and rectangular as is possible. The amplitude limited signal is then applied to subsequent stages of the system as two pairs of well balanced signals. The two pairs of balanced signals are each branched off at the output of the balanced limiter. One pair of signals is amplified to a required level by two cascaded R-F amplifiers in succession before their application to the gate circuit. The other pair of balanced signals is applied to a balanced delay network after amplification by a balanced R-F amplifier. Each signal of the balanced pair is thereby phase delayed by $(1+2n)\pi/2$ radians at or near the center carrier frequency. The delayed signals undergo further amplification to a suitable level by another balanced R-F amplifier at which time the second balanced pair of signals is applied to the above mentioned gate circuit to produce a final output signal. The demodulation apparatus thus converts the incoming F-M signal to a pulse-width modulated signal which can be simply and readily demodulated through the application of a low-pass filter which passes the DC components of the pulse-width modulated signal.

It is comparatively easy to provide balanced type amplifiers and delay networks having wide pass-bands. This is equivalent to stating that well balanced, rectangular shaped signals which are obtained from the balanced type limiter capable of generating such signals over a wide operating frequency band, can be operated upon maintaining the balanced state in order to provide an F-M demodulation system having superior linearity and $S/N$ ratio characteristics. It is further obvious that the linearity and $S/N$ ratio may be further improved through the use of auxiliary level compensating circuitry, if required. Such additional compensating circuitry, if required, is employed for adjusting the levels and the balanced state of the signals applied to the gate circuit.

It is therefore one object of the instant invention to provide a novel F-M demodulation system wherein F-M signals are converted into PWM type signals through the use of balanced circuitry.

Another object of the instant invention is to provide a novel F-M demodulation system for converting F-M signals into signals of the PWM type wherein the F-M signals are first converted into balanced pairs of signals with each pair being phase delayed relative to the other prior to the application of the balanced pairs of signals to gating circuitry for conversion into signals of the PWM type.

Still another object of the instant invention is to provide a novel F-M demodulation system for converting F-M signals into signals of the PWM type wherein the F-M signals are first converted into balanced pairs of signals with one of the pairs of signals being phase delayed relative to the other prior to the application of the balanced pairs of signals to gating circuitry for conversion into signals of the PWM type and wherein final demodulation is performed through the use of a low-pass filter for removing only the DC components contained in the PWM type signals.

These as well as other objects of the instant invention will become apparent when reading the accompanying description and drawings in which.

Figure 1:
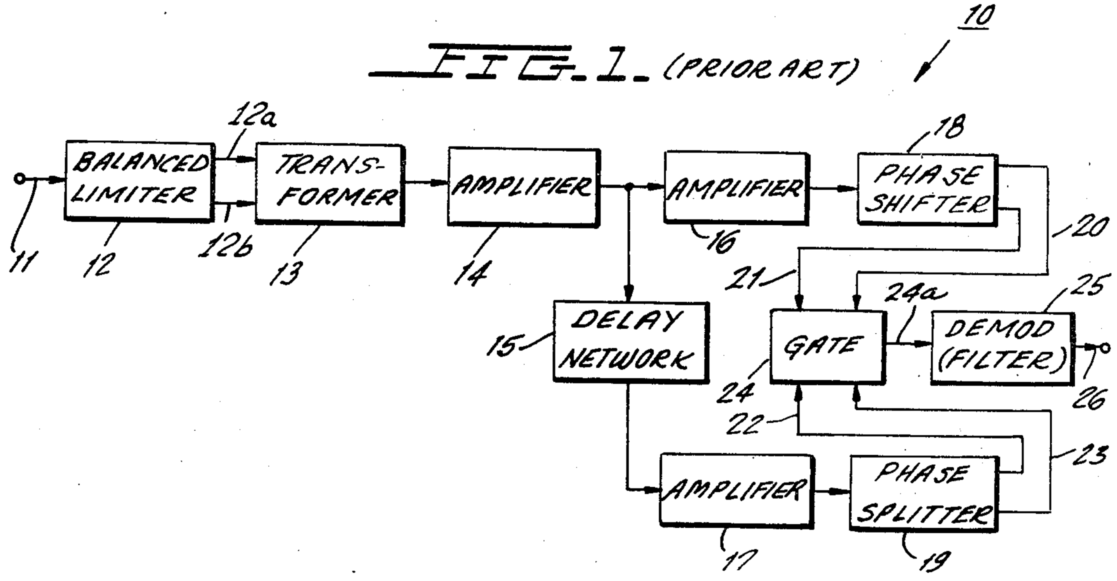
FIG. 1 (PRIOR ART)
FIG. 1 is a block diagram showing one conventional demodulation system.

The conventional F-M demodulation system 10, shown in FIG. 1, is provided with an input terminal 11 receiving incoming F-M signals. The F-M signals are applied to a balanced type limiter 12 which performs the function of amplifying and amplitude limiting the incoming F-M signal within predetermined constant limits so as to convert the incoming F-M signal into a substantially rectangular waveform. The balanced type limiter provides two output signals which are substantially identical to one another but are opposite in phase. The two output signals are applied to a balance/unbalance transformer 13 which converts the balanced output signals appearing at 12*a* and 12*b*, into a single unbalanced signal. The unbalanced signal is applied to a wide-band R-F amplifier 14 whose output is simultaneously impressed upon wide-band R-F amplifier 16 and delay network 15. After a predetermined delay imposed upon the signal by delay network 15, the signals of this channel are then applied to a third R-F amplifier stage 17 which amplifies the unbalanced signal and applies it to a phase splitting circuit 19. The signals amplified at 16 are likewise applied to the input of a phase splitting circuit 18. The phase splitting circuits 18 and 19 split the amplified signals applied to their inputs into two pairs of signals 20–21 and 22–23, respectively. The first pair of signals 20 and 21 are equal in amplitude and are 180° out of phase with one another. Likewise, the second pair of signals 22 and 23 are equal in amplitude and 180° out of phase. In addition to these relationships, the two pairs of signals 20–21 and 22–23 differ in phase relative to one another by a delay period $\tau$ which provides a phase delay of $(1/2+n)\pi$ radians at or near the center carrier frequency of the F-M signal. The phase delayed and amplified signal is applied to the phase splitting circuit 19, as set forth above, to produce the two balanced signals 22 and 23 which are equal in amplitude and are opposite in phase.

The pairs of signals 20–21 and 22–23 undergo gating action by the gate circuit 24 to produce an output signal at 24*a* which is a pulse-width-modulated replica of the input F-M signal. The carrier frequency components of the resultant signal may be eliminated through the use of a low-pass filter 25 which is designed only to pass the DC or low frequency components so as to yield the demodulated output signal at terminal 26.

Extreme care must be exercised in the design of such conventional systems, especially in the following respects:

The phase splitter outputs 20–21 and 22–23 of the phase splititng circuits 18 and 19, respectively, must be perfectly balanced relative to one another. The frequency characteristics of the two paths (the first path being comprised of R-F amplifiers 14 and 16 and phase splitter 18 and the second path being comprised of R-F amplifiers 14 and 17, delay network 15 and phase splitter 19) must be extremely good over a sufficiently wide frequency range.

Exhaustive experimentation has shown that it is extremely difficult to design phase splitters whose balanced output signals 20–21 and 22–23 are exactly equal over a wide operating frequency band. It has also been found to be difficult to widen the operating frequency band of the two paths through which the F-M signals pass. This yielded an F-M demodulation circuit in which it becomes extremely difficult to provide good operation over a sufficiently wide frequency band and which has optimum balancing amongst the two pairs of signals over the operating band. For these reasons, the performance of such F-M demodulating systems have shown that the linearity is significantly degraded in the upper portion of the operating frequency band and that carrier leakage can be found in subsequent amplification stages connected beyond the gating circuitry due to the lack of balance amongst the gate input signals 20–23, thereby resulting in a degradation of the $S/N$ ratio of the demodulated signal.

Figure 2:
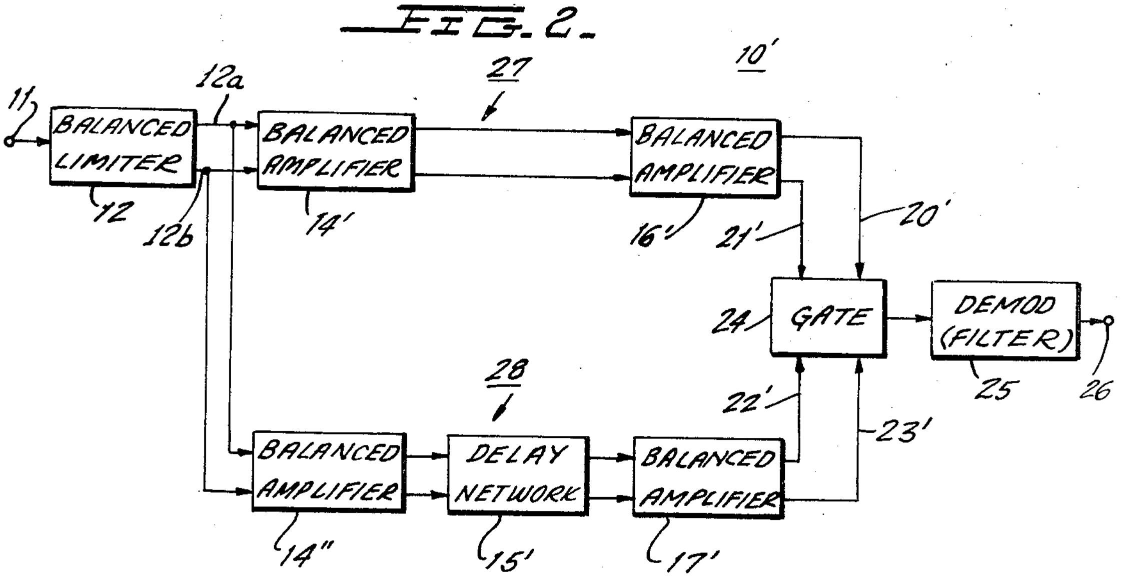
FIG. 2 is a block diagram of an F-M demodulation system incorporating the principles of the present invention.

FIG. 2 shows, in block diagram form, one preferred embodiment of the present invention wherein like numerals indicate similar circuitry as between the systems of FIGS. 1 and 2. Those numerals accompanied by primes indicate similar circuitry as compared with those numerals without primes, but with somewhat different circuit structures or signals derived from such structures. More specificaly, the balanced limiters 12, gate circuits 24 and low-pass filters 25 are of substantially similar design whereas the wide-band R-F amplifiers 14′, 14″, 16′ and 17′ and the balanced type delay network 15′ are all balanced type circuitry as compared with the circuitry of the unbalanced type employed in the prior art embodiment of FIG. 1. As a result of this modification, it is possible to obtain the gate driving signals 20′–23′ having the appropriate phase relationships as recited with regard to the conventional system without the need for providing means to converting from balanced to unbalanced signals at the balance limiter stage 12 and then subsequently to convert to balanced signals through the use of the phase splitting circuits 18 and 19. Thus, in summation, the need for the balance/unbalance transformer and the phase splitting circuitry is completely eliminated.

In operation, the PMW type system 10′ of FIG. 2 receives F-M signals at input terminal 11, which signals are amplitude limited by means of balanced limiter 12 which converts the input F-M signal into a substantially rectangular waveform and delivers balanced signals equal in both amplitude and waveform and opposite in phase simultaneously to the balanced amplifiers 14′ and 14″, respectively. The pair of signals thereby follows two separate paths 27 and 28 before application to the gating circuitry 24. In the first path 27 the signals are amplified in succession to R-F amplifiers 14′ and 16′. The R-F wideband amplifier stages develop balanced gate driving signals 20' and 21', respectively, which are equal both in amplitude and waveform and opposite in phase. The signals are applied to suitable inputs of the gating circuitry 24.

The remaining pair of signals amplified by balanced wide-band R-F amplifier 14'' are delayed in phase by the balanced type delay network 15' by a delay period $\tau$ so as to impart a phase delay to each signal of $(1/2+n)\ \pi$ radians (where $n$ is any arbitrary real integer) at or near the carrier center frequency. The phase-delayed signals are then amplified to a required level by the balanced wide-band R-F amplifier 17'. The second pair of balanced signals 22' and 23' which are equal in both amplitude and waveform and opposite in phase, are applied to appropriate inputs of gate circuitry 24. The gating action causes the F-M signals imposed upon the system to be converted to a PWM type signal which again may be demodulated by removing the carrier components contained therein and passing only the DC or low frequency components through the medium of low-pass filter 25.

Through the use of the demodulation system of FIG. 2, it has been found that degradation in the linearity occurring in the upper portion of the operating frequency pass-band (which is commonly encountered in conventional demodulation systems) is reduced to a minimum since the phase splitting circuitry, which has been found to be the primary cause of trouble, is eliminated from the system. Moreover, since it is relatively easy to design balanced R-F amplifiers and balanced delay networks having sufficiently wide pass-bands, the two pairs of well balanced rectangular shaped waveform signals generated by the balanced limiter 12 can thereby be utilized in the demodulation system such that the balanced condition is maintained throughout or at least up to the gating operation. This design thereby permits the realization of an F-M demodulation system having an extremely wide operating frequency band width and excellent linearity. Carrier leakage into subsequent stages which have been found to be the cause of degradation in the $S/N$ ratio in conventional systems as a result of imbalance of the gate driving signals is substantially eliminated. The gate driving signals 20'–23' can be balanced out easily by the balanced type circuit in each stage subsequent to the balance limiter in accordance with the present demodulation system so as to almost completely suppress carrier leakage and thereby provide significant improvement in the $S/N$ ratio of the demodulated signal.

It should further be noted that auxiliary compensating circuitry for finally adjusting the amplitudes, et cetera, of the gate driving signals may simply and readily be incorporated into the present system where required so as to still further improve the $S/N$ ratio and linearity of the system. In either case the F-M demodulation system has a great deal of practical utility.

Although there has been described a preferred embodiment of this novel invention, many variations and modifications will now be apparent to those skilled in the art. Therefore, this invention is to be limited, not by the specific disclosure herein, but only by the appending claims.

What is claimed is:

1. An F-M demodulation system comprising:

a balanced type limiter circuit receiving F-M signals for converting said F-M signals into a pair of amplitude-limited balance signals substantially equal in amplitude and similar in wave shape and opposite in phase;

first and second circuit paths each receiving said pair of balanced signals;

a gating circuit coupled to both of said circuit paths for converting said balanced F-M signals into a pulse-width-modulation type signal;

one of said circuit paths including a balanced type delay network for delaying the balance type signals applied to the associated circuit path relative to the remaining circuit path.

2. The F-M demodulation system of claim 1 further comprising filter means coupled to the output of said gating circuit for demodulating said pulse-width-modulated type signal.

3. The F-M demodulation system of claim 2 wherein said filter means is a low-pass filter means for eliminating the carrier frequency components of the pulse-width-modulation type signal.

4. The F-M demodulation system of claim 1 wherein each of said circuit paths is further provided with a wide-band R-F balanced amplifier for amplifying the balance signals applied to its associated circuit path.

5. The F-M demodulation system of claim 1 wherein said circuit paths are each provided with first and second balanced type R-F wide-band amplifiers for amplifying the balance signals applied to their associated circuit paths by a predetermined amount;

said balanced type delay means in said one of said circuit paths being coupled between the first and second R-F amplifiers of its associated circuit path.

References Cited

UNITED STATES PATENTS

| | | | |
|---|---|---|---|
| 2,835,803 | 5/1958 | Bose | 329—134 X |
| 3,022,461 | 2/1962 | Wilcox | 329—145 X |
| 3,100,875 | 8/1963 | Peterson | 329—145 |
| 3,274,514 | 9/1966 | Foulger | 328—112 X |
| 3,296,581 | 1/1967 | Warner | 325—474 X |

ALFRED L. BRODY, Primary Examiner

U.S. Cl. X.R.

307—233, 234; 325—324, 345, 474; 328—58, 112, 147; 329—134, 145

UNITED STATES PATENT OFFICE
CERTIFICATE OF CORRECTION

Patent No. 3,528,019 Dated September 8, 1970

Inventor(s) AKIRA INOUE

It is certified that error appears in the above-identified patent and that said Letters Patent are hereby corrected as shown below:

Column 1, line 44, after "demodulator" and before "whereas" insert -- . In one of the channels the signal undergoes amplification, --;

Column 2, line 4, after "band" delete the comma "," and substitute therefor a period -- . --; before "the" insert -- In the demodulation of F-M signals over a wide frequency band, --;

line 11, delete the colon ":" and substiture therefor a period -- . -- ;

line 34, after "teger" insert a closing parenthesis -- ) -- ;

Column 6, line 9, change "balance" to -- balanced --;

line 18, change "balance" to -- balanced -- .

SIGNED AND SEALED DEC 15 1970

(SEAL)
Attest:

Edward M. Fletcher, Jr.
Attesting Officer

WILLIAM E. SCHUYLER, JR.
Commissioner of Patents